(12) United States Patent
Baldoni et al.

(10) Patent No.: US 11,236,799 B2
(45) Date of Patent: Feb. 1, 2022

(54) VALVE ASSEMBLY FOR A DAMPER

(71) Applicant: Tenneco Automotive Operating Company Inc., Lake Forest, IL (US)

(72) Inventors: Frederik Baldoni, Borgloon (BE); Christof Kleynen, Scherpenheuvel-Zichem (BE); Jan Vochten, Sint-Truiden (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 135 days.

(21) Appl. No.: 16/540,290

(22) Filed: Aug. 14, 2019

(65) Prior Publication Data

US 2021/0048085 A1    Feb. 18, 2021

(51) Int. Cl.
| | |
|---|---|
| *F16F 9/504* | (2006.01) |
| *F16F 9/18* | (2006.01) |
| *F16F 9/32* | (2006.01) |
| *F16F 9/348* | (2006.01) |
| *F16F 9/34* | (2006.01) |
| *F16K 11/07* | (2006.01) |
| *F16F 9/19* | (2006.01) |

(Continued)

(52) U.S. Cl.
CPC ............... *F16F 9/504* (2013.01); *F16F 9/182* (2013.01); *F16F 9/19* (2013.01); *F16F 9/3221* (2013.01); *F16F 9/34* (2013.01); *F16F 9/348* (2013.01); *F16K 11/0712* (2013.01); *B60G 13/06* (2013.01); *B60G 13/08* (2013.01); *B60G 2202/24* (2013.01); *F16F 9/061* (2013.01); *F16F 9/063* (2013.01); *F16F 2222/12* (2013.01); *F16F 2224/025* (2013.01); *F16F 2228/066* (2013.01)

(58) Field of Classification Search
CPC .... B60G 13/06; B60G 13/08; B60G 2202/24; F16K 11/0712; F16F 9/3221; F16F 9/3214; F16F 9/5126; F16F 9/182; F16F 9/185; F16F 9/34; F16F 9/19; F16F 9/504; F16F 9/348; F16F 9/061; F16F 9/063; F16F 2224/025; F16F 2228/066; F16F 9/50; F16F 9/512; F16F 9/585; F16F 9/3488
USPC .... 188/275, 280, 269, 282.5, 282.6, 322.13, 188/322.15, 317
See application file for complete search history.

(56) References Cited

U.S. PATENT DOCUMENTS

| | | |
|---|---|---|
| 8,651,252 B2 | 2/2014 | Katayama et al. |
| 8,794,405 B2 | 8/2014 | Yamashita et al. |

(Continued)

FOREIGN PATENT DOCUMENTS

| | | |
|---|---|---|
| CN | 104500636 A | 4/2015 |
| JP | 5466437 B2 | 4/2014 |

*Primary Examiner* — Robert A. Siconolfi
*Assistant Examiner* — San M Aung
(74) *Attorney, Agent, or Firm* — McGarry Bair PC

(57) ABSTRACT

A valve assembly for a damper is provided. The valve assembly includes a housing defining a fluid cavity. The valve assembly includes a spool valve movably disposed within the housing. Further, the valve assembly includes a bumper disposed between the housing and the spool valve. At least the bumper, the spool valve and the housing together define an enclosed volume. The valve assembly further includes one or more bleed paths defined on at least one of the bumper, the spool valve and the housing, the one or more bleed paths fluidly communicating the fluid cavity with the enclosed volume.

17 Claims, 8 Drawing Sheets

(51) Int. Cl.
*B60G 13/08* (2006.01)
*B60G 13/06* (2006.01)
*F16F 9/06* (2006.01)

(56) References Cited

U.S. PATENT DOCUMENTS

| | | |
|---|---|---|
| 9,194,457 B2 | 11/2015 | Kim |
| 9,222,539 B1 | 12/2015 | Nowaczyk et al. |
| 9,239,092 B2 | 1/2016 | Nowaczyk et al. |
| 9,441,700 B2 | 9/2016 | Nowaczyk et al. |
| 9,500,255 B2 | 11/2016 | Nowaczyk et al. |
| 2002/0108825 A1* | 8/2002 | Miller ............... F16F 9/512 188/280 |
| 2015/0053518 A1* | 2/2015 | Nowaczyk ............ F16F 9/50 188/313 |
| 2015/0247546 A1* | 9/2015 | Nowaczyk ........... F16F 9/512 188/313 |
| 2016/0025181 A1* | 1/2016 | Nowaczyk ............ F16F 9/50 188/315 |
| 2016/0047432 A1* | 2/2016 | Nowaczyk ......... F16F 9/3488 188/280 |

\* cited by examiner

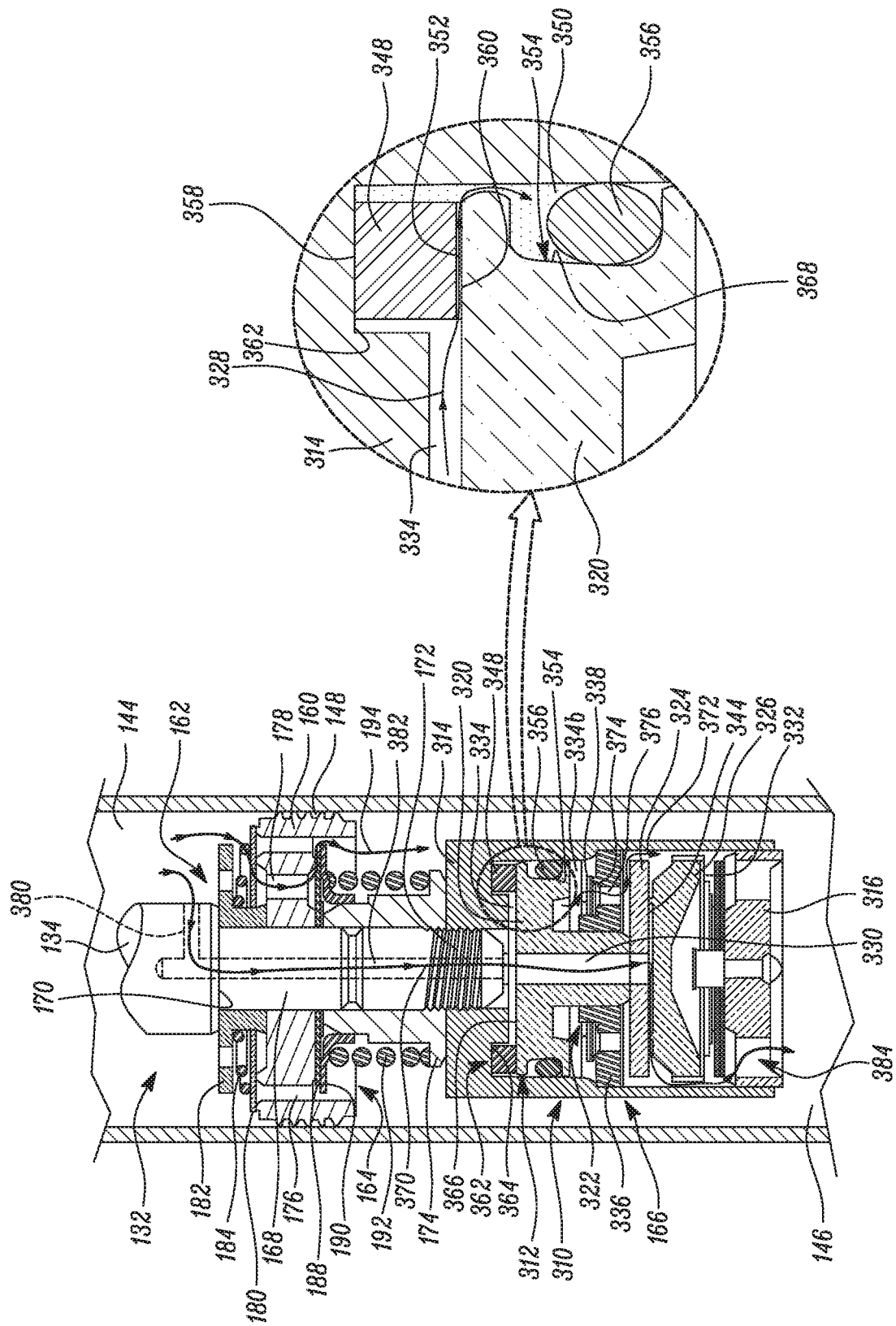

VALVE ASSEMBLY FOR A DAMPER

TECHNICAL FIELD

The present disclosure generally relates to dampers. More particularly, the present disclosure relates to a valve assembly for dampers.

BACKGROUND

Shock absorbers/dampers are generally installed on different types of equipment, such as vehicles, to dampen vibrations during operation. For example, dampers are generally connected between a body and the suspension system of the vehicle in order to absorb the vibrations. There are different types of dampers, for example, mono-tube dampers and double-tube dampers. Conventional mono-tube dampers typically include a pressure tube, a piston and a piston rod. The mono-tube dampers further include a floating piston to compensate for the volume of the piston rod. During a compression stroke and a rebound stroke of the damper, the piston can limit a flow of damping fluid between working chambers defined within the pressure tube due to which the damper produces a damping force for counteracting the vibrations. Conventional double-tube dampers typically include a reserve tube disposed around the pressure tube, and one or more additional valves.

Various types of damping force generating devices have been developed to generate desired damping forces in relation to the frequency of the inputs from the roads over which the vehicles travel. A frequency dependent selective damping device generally includes a spool valve movably disposed within a housing to provide the ability to have softer damping characteristics with higher frequency road inputs. These softer damping characteristics lead to a more effective isolation of a body of the vehicles from unwanted disturbances. Typically, these frequency dependent damping devices operate during an extension or rebound movement, a compression movement, or both rebound and compression movements of the hydraulic damper or shock absorber.

Typically, these frequency dependent damping devices include an enclosed area adjacent to the spool valve due to sealing of components. This enclosed area is generally not filled with hydraulic fluid and forms an air pocket during assembly. After pressurizing of the damper, the enclosed area can have low pressure. This low pressure area can draw the spool valve against the housing and prevent the spool valve from moving, thereby resulting in a blocking of the spool valve. The blocking of the spool valve can prevent normal operation of the frequency dependent damping devices, leading to increased rejection rates of dampers.

SUMMARY

In an aspect of the present disclosure, a valve assembly for a damper is provided. The valve assembly includes a housing defining a fluid cavity. The valve assembly includes a spool valve movably disposed within the housing. Further, the valve assembly includes a bumper disposed between the housing and the spool valve. At least the bumper, the spool valve and the housing together define an enclosed volume. The valve assembly further includes one or more bleed paths defined on at least one of the bumper, the spool valve and the housing, the one or more bleed paths fluidly communicating the fluid cavity with the enclosed volume.

In another aspect of the present disclosure, a damper is provided. The damper includes a pressure tube. The damper includes a piston assembly disposed within the pressure tube. The damper includes a piston rod projecting out of the pressure tube. The piston assembly is attached to the piston rod. The piston rod includes an axial passageway that forms an internal bore extending through a portion of a length of the piston rod and acts as a portion of a fluid bypass flow path. Further, the damper includes a valve assembly attached to the piston rod. The valve assembly includes a housing defining a fluid cavity. The valve assembly includes a spool valve movably disposed within the housing. The spool valve includes a hole extending through a full length of the spool valve and being in fluid communication with the axial passageway of the piston rod. The valve assembly includes a bumper disposed between the housing and the spool valve. At least the bumper, the spool valve and the housing together define an enclosed volume. Further, the valve assembly includes one or more bleed paths defined on at least one of the bumper, the spool valve and the housing, the one or more bleed paths fluidly communicating the fluid cavity with the enclosed volume.

In yet another aspect of the present disclosure, a damper is provided. The damper includes a pressure tube. The damper includes a piston assembly disposed within the pressure tube. The damper includes a piston rod projecting out of the pressure tube. The piston assembly is attached to the piston rod. The piston rod includes an axial passageway that forms an internal bore extending through a portion of a length of the piston rod and acts as a portion of a fluid bypass flow path. The damper includes a valve assembly attached to the piston rod. The valve assembly includes a housing defines a fluid cavity. The valve assembly includes a spool valve movably disposed within the housing. The spool valve defines an annular groove on an outer surface of the spool valve. The spool valve includes a hole extending through a full length of the spool valve and being in fluid communication with the axial passageway of the piston rod. The valve assembly includes a sealing member disposed within the groove. The valve assembly includes a bumper disposed between the housing and the spool valve. The sealing member, the spool valve, the bumper and the housing together define an enclosed volume. The valve assembly further includes one or more bleed paths defined on at least one of the bumper, the spool valve and the housing, the one or more bleed paths fluidly communicating the fluid cavity with the enclosed volume. The valve assembly further includes a bypass valve including an interface disposed adjacent to the spool valve. The bypass valve includes a valve body disposed adjacent to the interface. The bypass valve further includes a spring biasing the valve body against the interface.

Other features and aspects of this disclosure will be apparent from the following description and the accompanying drawings.

BRIEF DESCRIPTION OF DRAWINGS

FIG. 3A, is schematic illustration of a piston assembly and a valve assembly of the damper shown in FIG. 2, according to an aspect of the present disclosure;

FIG. 3B is an enlarged view of an enclosed volume of the valve assembly of FIG. 3A, according to an aspect of the present disclosure.

DETAILED DESCRIPTION

Wherever possible, the same reference numbers will be used throughout the drawings to refer to same or like parts.

Aspects of the disclosure generally relate to a valve assembly for a damper. The valve assembly includes a spool valve movably disposed within a housing. The valve assembly includes a bumper disposed between the housing and the spool valve. The spool valve, the bumper and the housing together define an enclosed volume. In some cases, the enclosed volume is not filled with hydraulic fluid and is therefore an air pocket. After pressurizing of the damper, the enclosed volume can have a low pressure. The spool valve can be blocked from movement within the housing due to the low pressure within the enclosed volume. At least one of the spool valve, the bumper and the housing is provided with one or more bleed paths to allow fluid exchange with the enclosed volume and ensure desired movement of the spool valve within the housing. The valve assembly can eliminate rejection of the damper due to the blocking of the spool valve.

Figure 1:
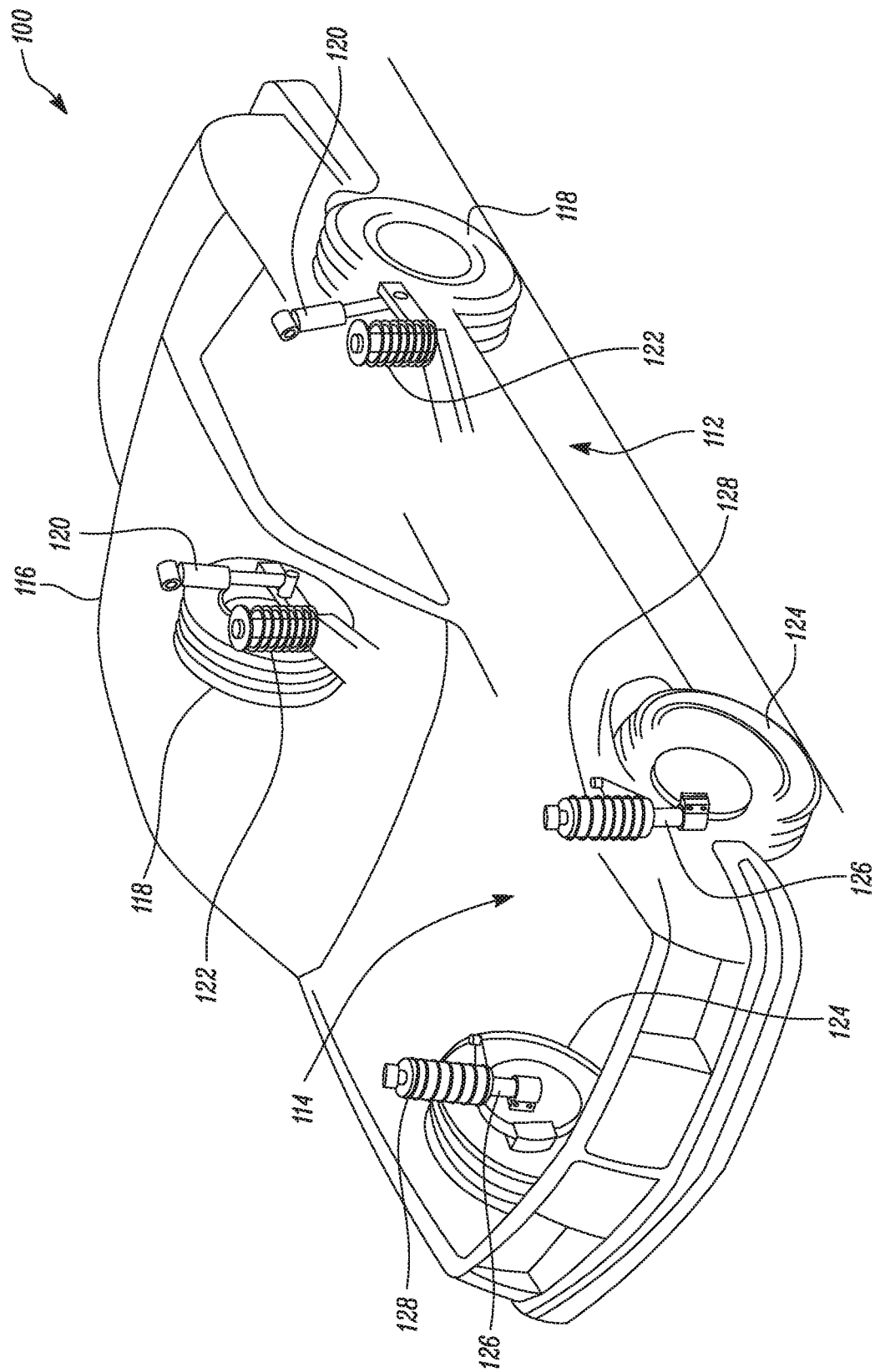
FIG. 1 is an illustration of a vehicle incorporating a suspension system, according to an aspect of the present disclosure.

FIG. 1 illustrates an exemplary vehicle 100 in accordance with the present disclosure. The vehicle 100 can include a vehicle driven by an internal combustion engine, an electric vehicle, or a hybrid vehicle. The vehicle 100 includes a rear suspension 112, a front suspension 114 and a body 116. The rear suspension 112 has a transversely extending rear axle assembly (not shown) adapted to operatively support a pair of rear wheels 118. The rear axle is attached to the body 116 by a pair of dampers 120 and a pair of springs 122. Similarly, the front suspension 114 includes a transversely extending front axle assembly (not shown) to operatively support a pair of front wheels 124. The front axle assembly is attached to the body 116 by a pair of dampers 126 and a pair of springs 128. The dampers 120 and 126 serve to dampen the relative motion of the unsprung portion (i.e., the front and rear suspensions 114, 112) with respect to the sprung portion (i.e., the body 116) of the vehicle 100. While the vehicle 100 has been depicted as a passenger car having front and rear axle assemblies, the dampers 120 and 126 can be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term damper as used herein is meant to refer to dampers in general and thus will include McPherson struts and other damper designs known in the art.

Figure 2:
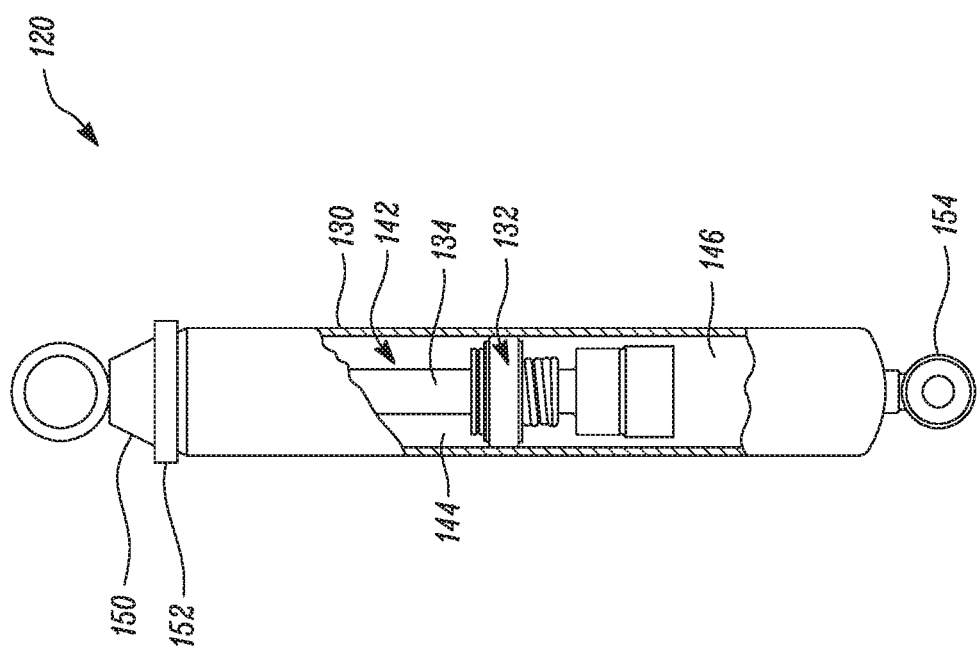
FIG. 2 is a schematic illustration of a damper associated with the suspension system of FIG. 1, according to an aspect of the present disclosure.

Referring now to FIG. 2, the damper 120 is shown in greater detail. While FIG. 2 illustrates only the damper 120, it is to be understood that the damper 126 also includes a valve design described below for the damper 120. The damper 126 only differs from the damper 120 in the manner in which it is adapted to be connected to the sprung and unsprung masses of the vehicle 100. The damper 120 includes a pressure tube 130, a piston assembly 132, and a piston rod 134. The damper 120 further includes a floating piston (not shown) to compensate for the volume of the piston rod 134.

The pressure tube 130 defines a fluid chamber 142. The piston assembly 132 is slidably disposed within the pressure tube 130 and divides the fluid chamber 142 into an upper working chamber 144 and a lower working chamber 146. A seal 148 (shown in FIG. 3A) is disposed between the piston assembly 132 and the pressure tube 130 to permit sliding movement of the piston assembly 132 with respect to the pressure tube 130 without generating undue frictional forces as well as sealing the upper working chamber 144 from the lower working chamber 146. The piston rod 134 is attached to the piston assembly 132 and extends through the upper working chamber 144. The piston rod 134 also extends through an upper end cap 150 which closes an upper end of the pressure tube 130. A sealing system 152 seals an interface between the upper end cap 150 and the piston rod 134. The end of the piston rod 134 opposite to the piston assembly 132 is adapted to be secured to the sprung portion of the vehicle 100. In an embodiment, the piston rod 134 is secured to the body 116 or the sprung portion of the vehicle 100. The pressure tube 130 is filled with a fluid and it includes a fitting 154 for attachment to the unsprung portion of the vehicle 100. In an embodiment, the fitting 154 is secured to the unsprung portion of the vehicle 100. Thus, suspension movements of the vehicle 100 will cause extension or compression movements of the piston assembly 132 with respect to the pressure tube 130. Valving within the piston assembly 132 controls the movement of the fluid between the upper working chamber 144 and the lower working chamber 146 during movement of the piston assembly 132 within the pressure tube 130.

Though the damper 120 is illustrated as a mono-tube damper, the present disclosure can also be applicable to a twin-tube damper. The twin-tube damper generally includes a reserve tube disposed around the pressure tube 130, and a base valve disposed at a bottom end of the pressure tube 130.

Referring now to FIGS. 3A, 3B, the piston assembly 132 is attached to the piston rod 134 and includes a piston body 160, a compression valve assembly 162, an extension or rebound valve assembly 164 and a valve assembly 166. In an embodiment, the valve assembly 166 is a frequency dependent valve assembly which provides frequency dependent damping in rebound (extension) only. In another embodiment, the valve assembly 166 can provide frequency dependent damping in compression only. In yet another embodiment, the valve assembly 166 is a frequency dependent valve assembly which provides frequency dependent damping in both rebound (extension) or compression. The piston rod 134 includes a reduced diameter section 168 located on the end of the piston rod 134 disposed within the pressure tube 130 to form a shoulder 170 for mounting the remaining components of the piston assembly 132. The piston body 160 is located on the reduced diameter section 168 with the compression valve assembly 162 being located between the piston body 160 and the shoulder 170. The rebound valve assembly 164 is located between the piston body 160 and a threaded end 172 of the piston rod 134.

Further, a retaining nut 174 is threadingly or slidingly received on the threaded end 172 or the reduced diameter section 168 of the piston rod 134 to secure the piston body 160, the compression valve assembly 162 and the rebound valve assembly 164 to the piston rod 134. In some embodiments, the rebound valve assembly 164 can be implemented without the retaining nut 174, where a valve, such as the valve assembly 166, can be used as a retaining member. The piston body 160 defines a plurality of compression flow passages 176 and a plurality of rebound flow passages 178.

The compression valve assembly 162 includes a compression valve plate 180, a valve stop 182 and a spring 184. The valve plate 180 is disposed adjacent to the piston body 160 to cover the plurality of the compression flow passages 176. The valve stop 182 is disposed adjacent to the shoulder 170, and the spring 184 is disposed between the valve plate 180 and the valve stop 182 to bias the valve plate 180 against the piston body 160. During a compression stroke of the shock absorber 120, fluid pressure builds up in lower working chamber 146 until the fluid pressure applied to the valve plate 180 through the compression flow passages 176 overcomes the load provided by the spring 184. The valve plate 180 will move away from the piston body 160 and compress the spring 184 to open the compression flow passages 176 to allow fluid to flow from the lower working chamber 146 to the upper working chamber 144.

The rebound valve assembly 164 includes one or more valve plates 188, a spring seat 190 and a spring 192. The valve plates 188 are disposed adjacent to the piston body 160 to cover the rebound flow passages 178. The spring seat 190 is disposed immediately adjacent the valve plates 188. The spring 192 is disposed between the spring seat 190 and the retaining nut 174 to bias the spring seat 190 against the valve plates 188 and the valve plates 188 against the piston body 160. The retaining nut 174 is threaded onto the threaded end 172 of the piston rod 134 to retain the valve plates 188 against the piston body 160 to close the rebound flow passages 178 using the spring 192 and the spring seat 190. During an extension stroke of the shock absorber 120, fluid pressure builds up in the upper working chamber 144 until the fluid pressure applied to the valve plates 188 through the rebound flow passages 178 overcomes the load provided by the spring 192. The valve plates 188 will move away from the piston body 160 and compress the spring 192 to open the rebound flow passages 178 to allow fluid to flow from the upper working chamber 144 to the lower working chamber 146 as shown by arrows 194 in FIG. 3A.

The piston assembly 132 illustrated in FIG. 3A is exemplary in nature, and the piston assembly 132 can have alternative configurations within the scope of the present disclosure. Further, the valve assembly 166 can be used with different types of piston assemblies.

The valve assembly 166 includes a housing 310 and a spool valve assembly 312. The housing 310 includes an upper housing 314 and a lower housing 316. The upper housing 314 is threadingly or otherwise attached to the end of the piston rod 134. The lower housing 316 is threadingly or otherwise attached to the upper housing 314.

The spool valve assembly 312 includes a spool valve 320 and a sealing member 356. The valve assembly 166 includes a check valve 322, a valve seat plate 324, an interface 326, and a spring 332. The spool valve 320 is disposed within a fluid cavity 334 defined by the housing 310. The check valve 322 includes a valve body 336, a valve plate 338, and a tunable orifice disc 374 disposed between the valve body 336 and the valve plate 338. In some embodiments, the check valve 322 can work in both directions as a controlled orifice. The spool valve 320 is slidably disposed within both the valve body 336 and the housing 310. The valve body 336 is fixedly attached to the upper housing 314. The valve seat plate 324 is disposed against the spool valve 320. The interface 326 is disposed against the valve seat plate 324. The spring 332 is disposed between the lower housing 316 and the interface 326 to bias the interface 326 against the valve seat plate 324. The valve seat plate 324, the interface 326 and the spring 332 form a bypass valve.

The damper 120 includes the piston assembly 132 being attached to the piston rod 134 and the piston rod 134 including an axial passageway 382 that forms an internal bore extending through a portion of a length of the piston rod 134 and acting as a portion of a fluid bypass flow path 370. The damper 120 includes the valve assembly 166 attached to the piston rod 134. The valve assembly 166 includes the spool valve 320 movably disposed within the housing 310. The spool valve 320 defines an annular groove 354 on an outer surface 368 of the spool valve 320. The spool valve 320 includes a hole 330 extending through a full length of the spool valve 320 and being in fluid communication with the axial passageway 382 of the piston rod 134. The valve assembly 166 includes the sealing member 356 disposed within the groove 354. The sealing member 356 can be an O-ring or any other sealing means as known or used in the art and the present disclosure is not to be limited by the sealing member 356 in any manner. The sealing member 356 can be made of an elastomer, such as rubber.

The valve assembly 166 includes a bumper 348 disposed between the housing 310 and the spool valve 320. The housing 310 defines an annular shoulder 362, and the bumper 348 is at least partly received within the annular shoulder 362. The bumper 348 is primarily provided to absorb any shock that can occur during interactions between the housing 310 and the spool valve 320. For similar reasons, the bumper can be made of a material (for example, rubber and polymers) having desired shock absorbing characteristics as will be known to a person having knowledge in the art. The sealing member 356, the spool valve 320, the bumper 348 and the housing 310 together define an enclosed volume 350. The valve assembly 166 further includes one or more bleed paths 352 defined on at least one of the bumper 348, the spool valve 320 and the housing 310. Each bleed path 352 is a channel defined on at least one of the bumper 348, the spool valve 320 and the housing 310. The one or more bleed paths 352 fluidly communicate, as shown by an arrow 328 (shown in FIG. 3B), the fluid cavity 334 with the enclosed volume 350. This ensures that the spool valve 320 is not blocked within the housing 310 due to development of low pressure within the enclosed volume 350. Specifically, the one or more bleed paths 352 fluidly communicate the enclosed volume 350 with the fluid cavity 334 to prevent formation of low static pressure after pressurizing of the damper 120. Therefore, the spool valve 320 can move relative to the housing 310 without being drawn against the housing 310 by low pressure. It is worth noting that the bleed paths 352 are so small that they do not influence any damping behavior of the damper 120. However, the bleed paths 352 allow exchange of fluid between the fluid cavity 334 (or any area around the spool valve 320) and the enclosed volume 350 as shown by the arrow 328.

In some embodiments, the one or more bleed paths 352 includes eight bleed paths 352 disposed about at least one of the bumper 348, the spool valve 320 and the housing 310. A number, location, shape, and angular spacing of the bleed paths 352 are merely representative as illustrated in various embodiments of the present disclosure. Other variations of the bleed paths 352 have been contemplated and all such variations are well within the scope of the present disclosure.

Figure 3C:
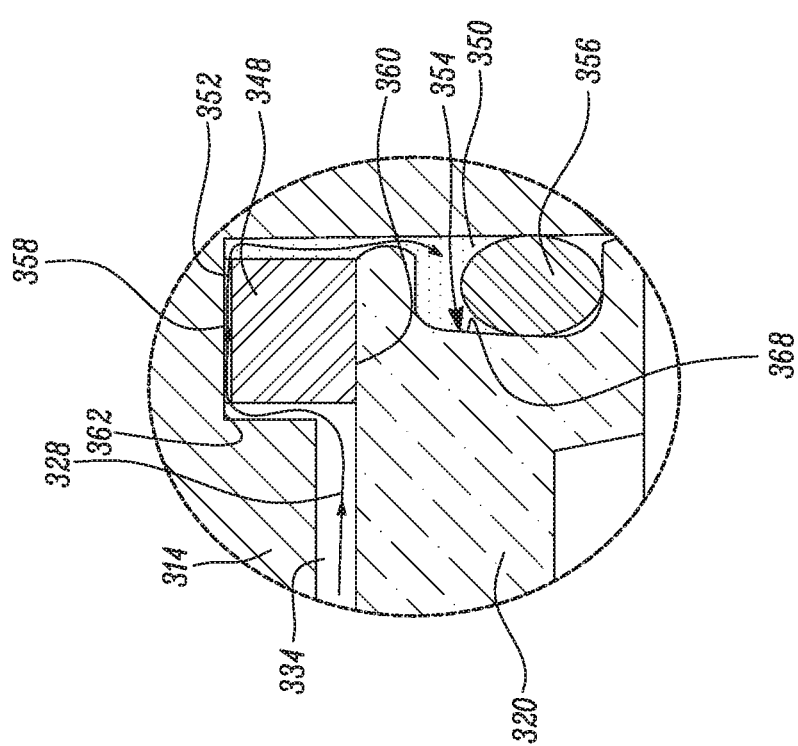
FIG. 3C is an enlarged view of the enclosed volume of the valve assembly of FIG. 3A, according to another aspect of the present disclosure.

As shown in FIG. 3B, the one or more bleed paths 352 are disposed on a lower surface 360 of the bumper 348. The lower surface 360 of the bumper 348 abuts the spool valve 320. However, as shown in FIG. 3C, the one or more bleed paths 352 are disposed on an upper surface 358 of the bumper 348. The upper surface 358 is opposite to the lower surface 358 and abuts the housing 310. In some cases, both the upper and lower surfaces 358, 360 can include the one or more bleed paths 352.

The valve assembly 166 includes the bypass valve having the valve seat plate 324 disposed adjacent to the spool valve 320. The bypass valve includes the interface 326 disposed adjacent to the valve seat plate 324. Further, the bypass valve includes the spring 332 biasing the interface 326 against the valve seat plate 324.

Referring to FIG. 3A, fluid flow during a rebound stroke of the damper 120 is illustrated. During a rebound stroke, fluid pressure in the upper working chamber 144 and in the rebound flow passages 178 will increase until the biasing load on the valve plate 188 increases to the point that the spring 192 is compressed and the valve plate 188 is lifted entirely off of the piston body 160 to fully open the rebound flow passages 178 as illustrated by the arrow 194. The rebound valve assembly 164 is a passive valve assembly with a firm damping characteristic.

At the beginning of the rebound stroke, prior to the opening of the rebound valve assembly 164, fluid will flow through the flow path illustrated by the arrow 370 which bypasses the piston body 160, the compression valve assembly 162 and the rebound valve assembly 164. Fluid can also flow through the flow path 370 after opening of the rebound valve assembly 164. The flow path 370 extends from the upper working chamber 144 through a radial passageway 380 and the axial passageway 382 both extending through the piston rod 134, through the hole 330 in the spool valve 320 into a bypass chamber 344 defined by the valve seat plate 324 and the interface 326. The flow path 370 proceeds around the interface 326 and through at least one aperture 384 in the lower housing 316 into the lower working chamber 146. During a high frequency movement, the spool valve 320 moves only a small distance. Because of this small movement, the preload created by the spring 332 is low and the fluid pressure in the bypass chamber 344 will easily separate the interface 326 from the valve seat plate 324 to create the flow illustrated by arrow 370 which flows through the one or more apertures extending through the lower housing 316. During a low frequency movement, the spool valve 320 is able to move a significant distance. This larger movement will move the valve seat plate 324 and the interface 326. This larger movement will compress the spring 332 which increases the preload generated by the spring 332 and the fluid pressure required to separate the interface 326 from the valve seat plate 324. As the load generated by the spring 332 increases, the flow depicted by the arrow 370 will decrease to provide a smooth transition from an initially soft damping condition to a firm damping condition for the damper 120. The slow closing of fluid flow 370 by the movement of the spool valve 320 will provide the smooth transition. An arrow 372 depicts the flow of fluid out of a fluid cavity 334b during movement of the spool valve 320 during rebound stroke. Fluid flows from the fluid cavity 334b through the tunable orifice disc 374 disposed between the valve body 336 and the valve plate 338. Fluid then flows through one or more holes 376 in the valve body 336, and into the lower working chamber 146. The check valve 322 remains closed during this movement of the spool valve 320 in a rebound stroke and opens to allow for the return of fluid into the fluid cavity 334b from the lower working chamber 146 during a compression stroke. In some other embodiments, the check valve 322 can restrict fluid flow during the compression stroke to reduce the speed of the spool valve 320, thereby reducing an impact of the spool valve 320 against the bumper 348. This may reduce noise.

Figure 4:
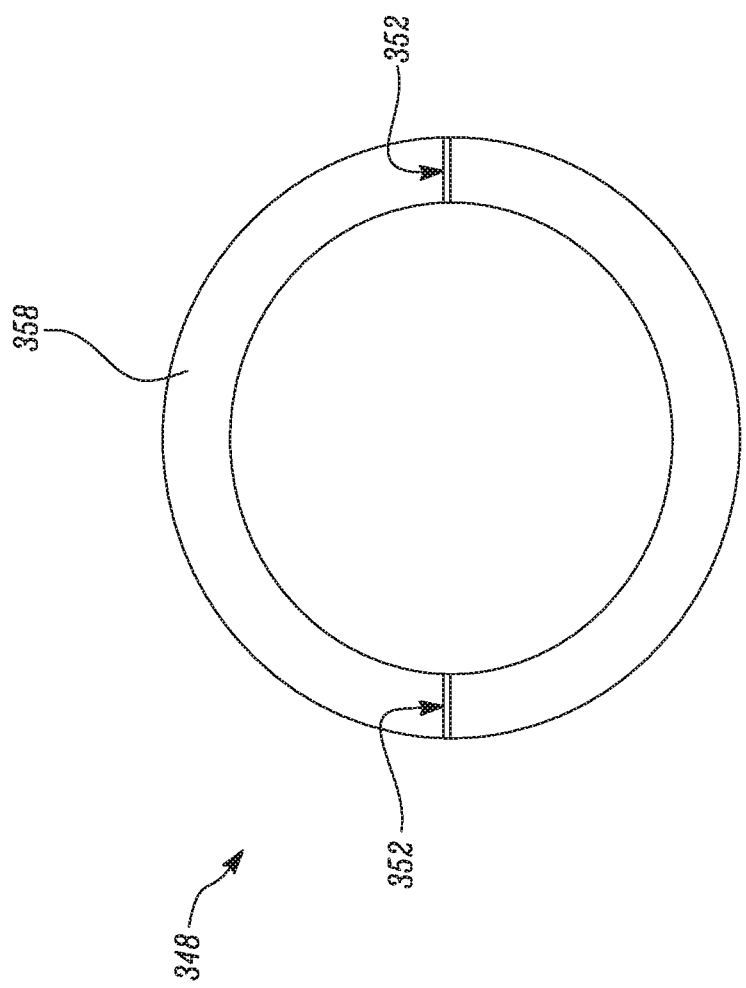
FIG. 4 is an illustration of a top view of a bumper of the valve assembly with one or more bleed paths, according to an aspect of the present disclosure.

Referring now to FIG. 4 along with FIGS. 3A and 3B, the bumper 348 is illustrated to include an upper surface 358 which abuts the housing 310 and a lower surface 360 which abuts the spool valve 320, as best illustrated in FIG. 3B. Though in the illustrated embodiment of FIG. 4, the bleed paths 352 are defined on the upper surface 358, the bleed paths 352 can be defined on at least one of the upper surface 358 and the lower surface 360 of the bumper 348. Further, as shown in FIG. 4, the upper surface 358 includes two bleed paths 352 that are separated by approximately 180 degrees. However, a number, position, dimension of the bleed paths 352 will be dependent upon multiple factors such as the enclosed volume 350 defined by the bumper 348, the spool valve 320 and the housing 310, or by the degree of low pressure around the enclosed volume 350 which blocks the movement of the spool valve 320.

Figure 5:
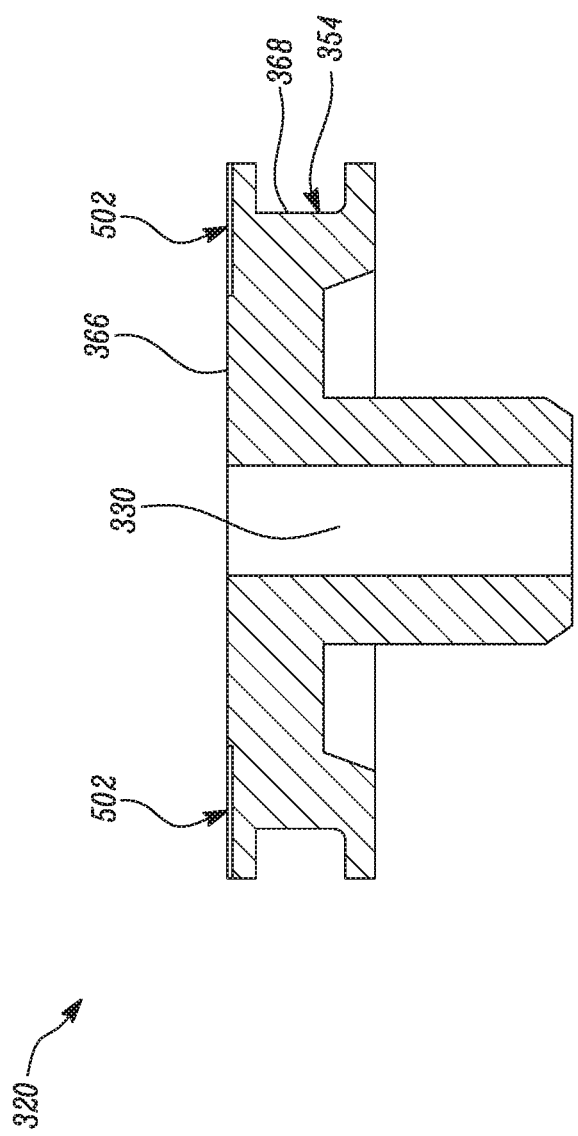
FIG. 5 is an illustration of a spool valve of the valve assembly with one or more bleed paths, according to an aspect of the present disclosure.
Figure 6:
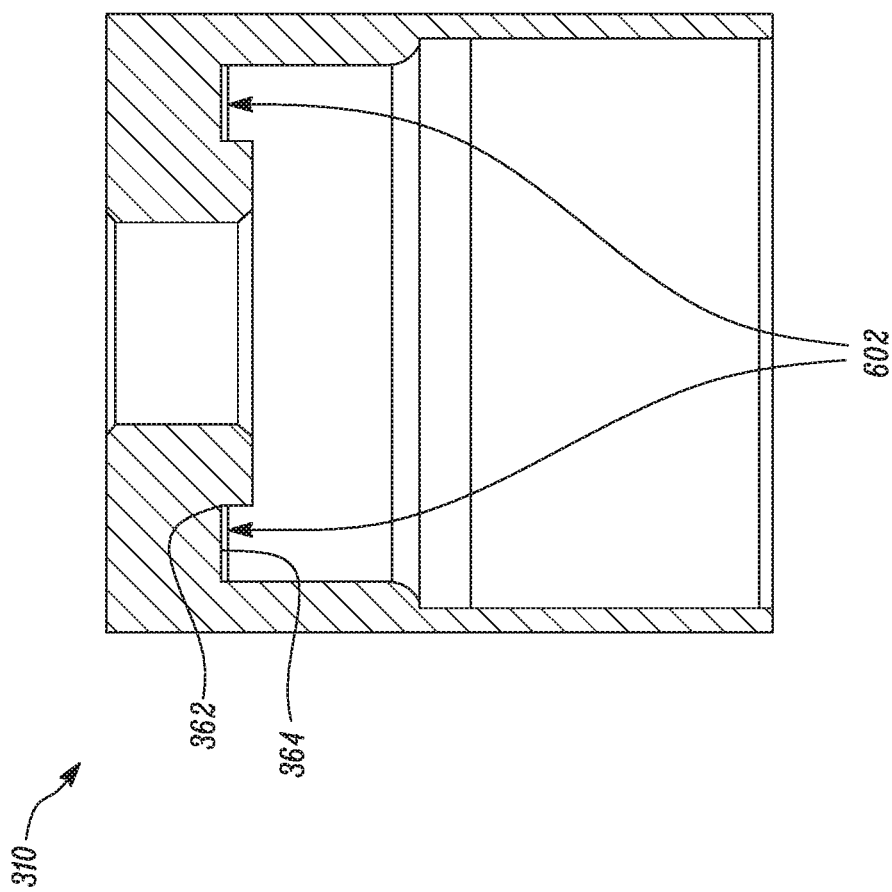
FIG. 6 is an illustration of a housing of the valve assembly with one or more bleed paths, according to an aspect of the present disclosure.
Figure 7:
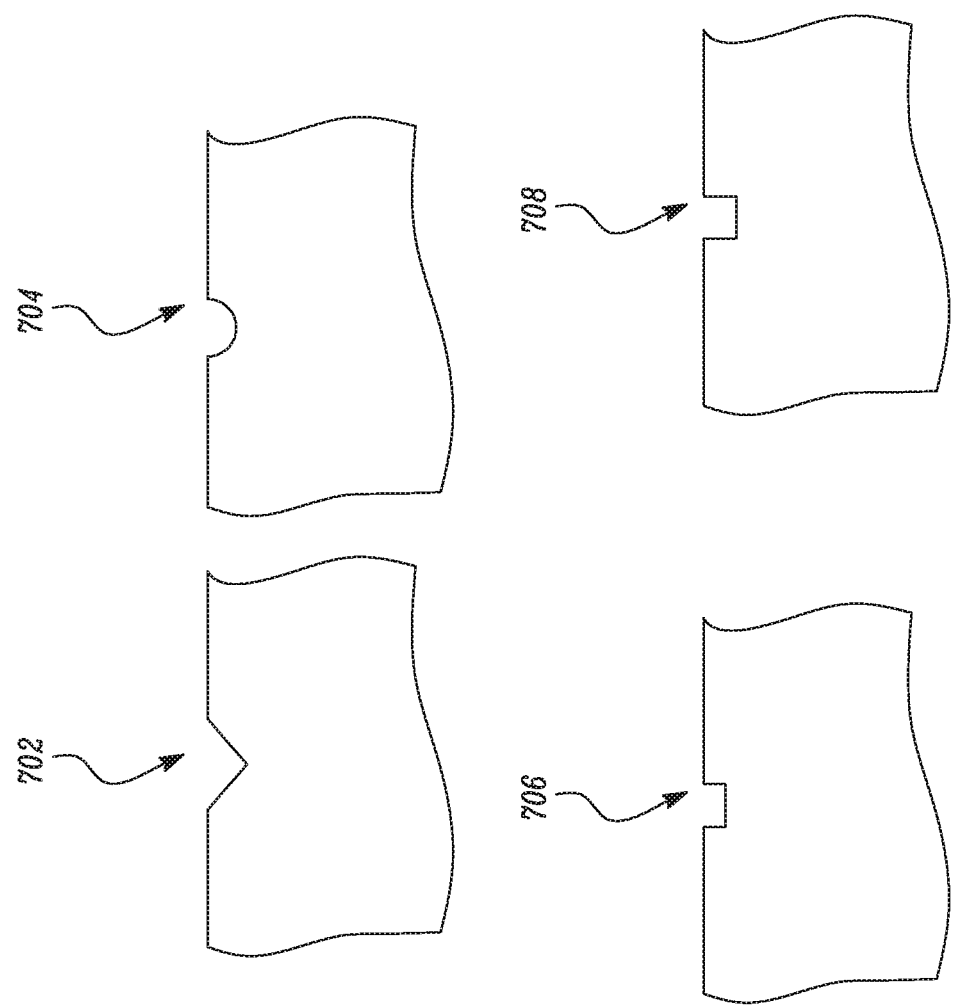
FIG. 7 is an illustration of different shapes of one or more bleed paths, according to an aspect of the present disclosure.

Referring now to FIG. 5, the spool valve 320 is illustrated with the one or more bleed paths 502 defined on an upper surface 366 of the spool valve 320. FIG. 6 illustrates the housing 310 where the one or more bleed paths 602 are defined on an inner surface 364 of the housing 310. As will be evident from FIGS. 4, 5, 6, different positions, numbers, dimensions of the bleed paths 352, 502, 602 are possible and in some cases the bleed paths 352, 502, 602 can be provided on one or more of the bumper 348, the spool valve 320, the housing 310. The bleed paths 352, 502, 602 can be provided on more than one of the bumper 348, the spool valve 320, the housing 310 in case there is a high possibility of blocking of the spool valve 320 within the housing 310, or from any other consideration. Further, each of the one or more bleed paths 352, 502, 602 can have a shape selected from any of a square 708 rectangular 706, round 704, or V-shaped 702, as illustrated in FIG. 7. Moreover, the bleed paths 352, 502, 602 can have any other geometrical or general shape as will be evident to a person having knowledge in the art.

While aspects of the present disclosure have been particularly shown and described with reference to the embodiments above, it will be understood by those skilled in the art that various additional embodiments can be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A valve assembly for a damper comprising:
   a housing defining a fluid cavity;
   a spool valve movably disposed within the housing;
   a bumper disposed between the housing and the spool valve and having an upper surface abutting the housing and a lower surface abutting the spool valve, wherein a sealing member, the bumper, the spool valve and the housing together define an enclosed volume; and
   one or more bleed paths defined on at least one of the bumper, the spool valve and the housing and the one or more bleed paths are disposed in at least one of the upper surface and the lower surface of the bumper, the one or more bleed paths fluidly communicating the fluid cavity with the enclosed volume.

2. The valve assembly of claim 1, wherein the spool valve defines an annular groove on an outer surface of the spool valve.

3. The valve assembly of claim 2, further comprising a sealing member is disposed within the groove, and wherein the sealing member, the spool valve, the bumper and the housing together define the enclosed volume.

4. The valve assembly of claim 1, wherein the housing defines an annular shoulder, and wherein the bumper is at least partly received within the annular shoulder.

5. The valve assembly of claim 1, wherein the one or more bleed paths are defined on an inner surface of the housing.

6. The valve assembly of claim 1, wherein the one or more bleed paths are defined on an upper surface of the spool valve.

7. The valve assembly of claim 1, wherein the one or more bleed paths comprises eight bleed paths disposed about at least one of the bumper, the spool valve and the housing.

8. The valve assembly of claim 1, wherein each of the one or more bleed paths is square, rectangular, round, or V-shaped.

9. The valve assembly of claim 1 further comprising a bypass valve including:
a valve seat plate disposed adjacent to the spool valve;
an interface disposed adjacent to the valve seat plate; and
a spring biasing the interface against the valve seat plate.

10. A damper comprising:
a pressure tube;
a piston assembly disposed within the pressure tube;
a piston rod projecting out of the pressure tube, the piston assembly being attached to the piston rod and the piston rod including an axial passageway that forms an internal bore extending through a portion of a length of the piston rod and acting as a portion of a fluid bypass flow path; and
a valve assembly attached to the piston rod, the valve assembly comprising:
a housing defining a fluid cavity;
a spool valve movably disposed within the housing, wherein the spool valve includes a hole extending through a full length of the spool valve and being in fluid communication with the axial passageway of the piston rod;
a bumper disposed between the housing and the spool valve and having an upper surface abutting the housing and a lower surface abutting the spool valve, wherein a sealing member, the bumper, the spool valve and the housing together define an enclosed volume; and
one or more bleed paths defined on at least one of the bumper and the one or more bleed paths are disposed in at least one of the upper surface and the lower surface of the bumper, the spool valve and the housing, the one or more bleed paths fluidly communicating the fluid cavity with the enclosed volume.

11. The damper of claim 10, wherein the one or more bleed paths are defined on an inner surface of the housing.

12. The damper of claim 10, wherein the one or more bleed paths are defined on an upper surface of the spool valve.

13. A damper comprising:
a pressure tube;
a piston assembly disposed within the pressure tube;
a piston rod projecting out of the pressure tube, the piston assembly being attached to the piston rod and the piston rod including an axial passageway that forms an internal bore extending through a portion of a length of the piston rod and acting as a portion of a fluid bypass flow path; and
a valve assembly attached to the piston rod, the valve assembly comprising:
a housing defining a fluid cavity;
a spool valve movably disposed within the housing, the spool valve defining an annular groove on an outer surface of the spool valve, wherein the spool valve includes a hole extending through a full length of the spool valve and being in fluid communication with the axial passageway of the piston rod;
a sealing member disposed within the groove;
a bumper disposed between the housing and the spool valve and having an upper surface abutting the housing and a lower surface abutting the spool valve, wherein the sealing member, the spool valve, the bumper and the housing together define an enclosed volume;
one or more bleed paths defined on at least one of the bumper and the one or more bleed paths are disposed in at least one of the upper surface and the lower surface of the bumper, the spool valve and the housing, the one or more bleed paths fluidly communicating the fluid cavity with the enclosed volume; and
a bypass valve including:
a valve seat plate disposed adjacent to the spool valve;
an interface disposed adjacent to the valve seat plate; and
a spring biasing the interface against the valve seat plate.

14. The damper assembly of claim 13, wherein the one or more bleed paths are defined on an inner surface of the housing.

15. The valve assembly of claim 13, wherein the one or more bleed paths are defined on an upper surface of the spool valve.

16. The valve assembly of claim 1, wherein the one or more bleed paths are disposed in the upper surface of the bumper defining a fluid flow path between the bumper and the housing.

17. The valve assembly of claim 16, wherein the bleed path is defined between the upper surface of the bumper and an annular shoulder of the housing.

* * * * *